I. W. BUSH.
AUTOMATIC DENTAL BLOWER AND SYRINGE.
APPLICATION FILED JUNE 17, 1913.
1,080,261.  Patented Dec. 2, 1913.
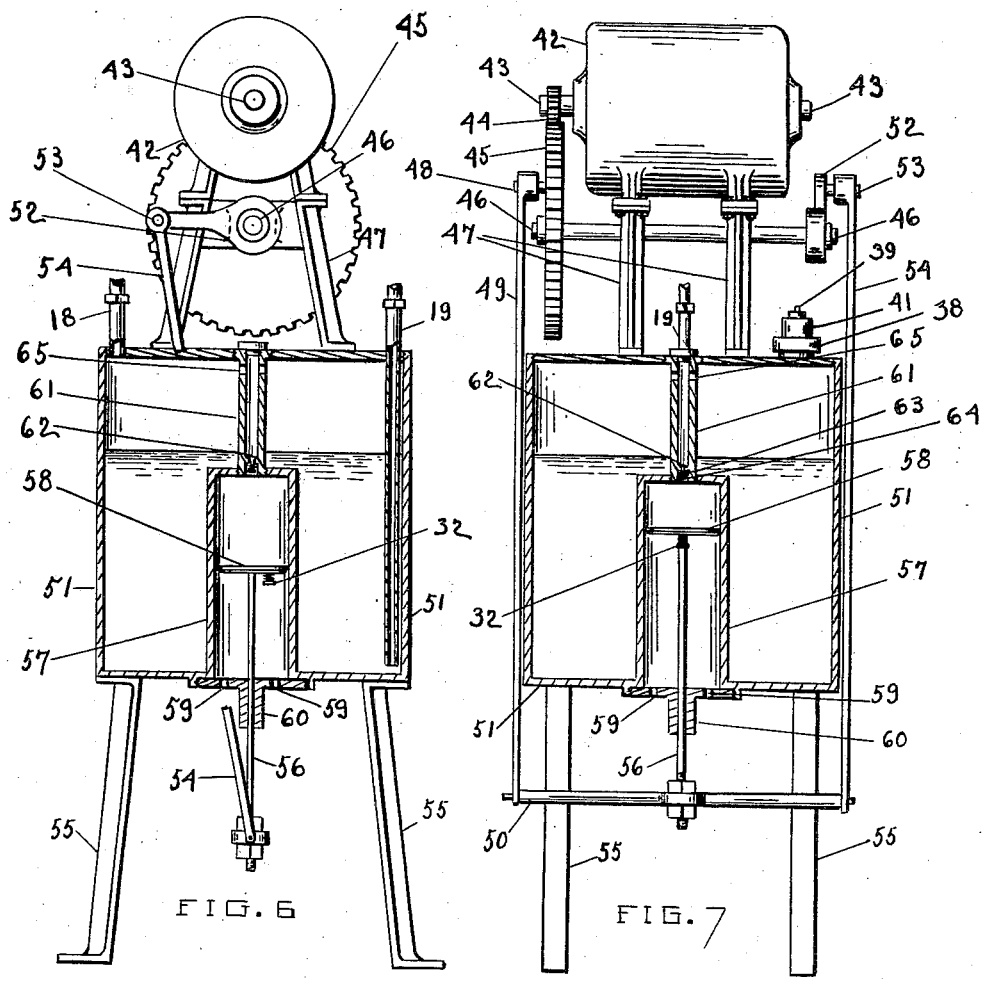
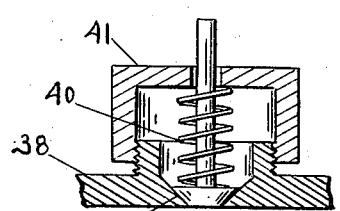
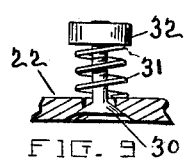
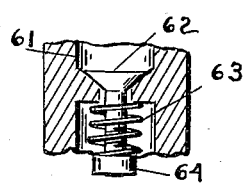
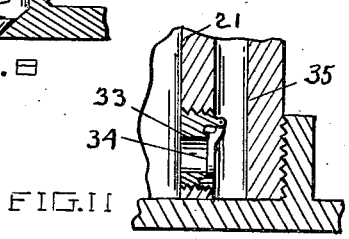
INVENTOR
Isaac Walton Bush
BY
ATTORNEY

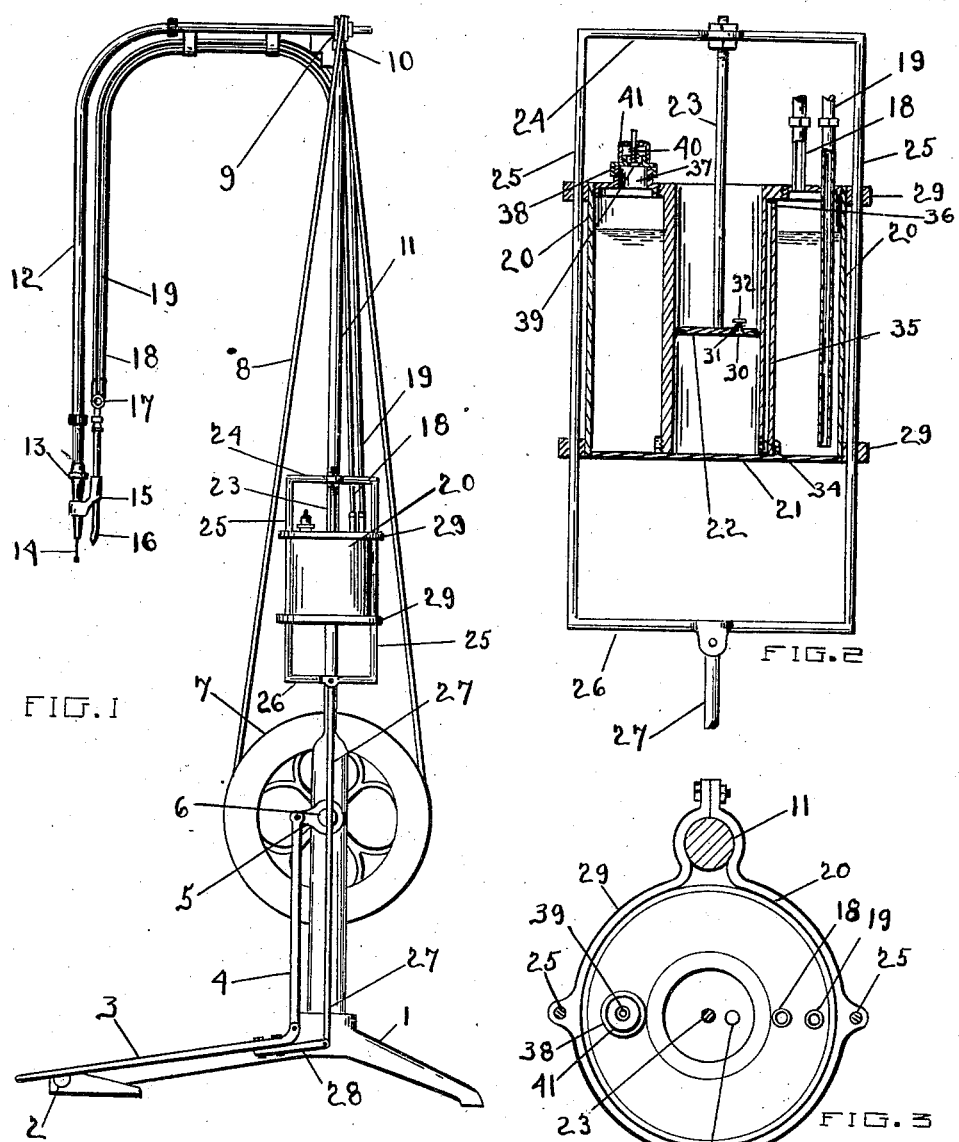

UNITED STATES PATENT OFFICE.

ISAAC WALTON BUSH, OF NORTH CARROLLTON, MISSISSIPPI, ASSIGNOR OF ONE-THIRD TO EUGENE C. NEILL AND ONE-THIRD TO JESSE F. COTTON, BOTH OF NORTH CARROLLTON, MISSISSIPPI.

AUTOMATIC DENTAL BLOWER AND SYRINGE.

1,080,261.        Specification of Letters Patent.       Patented Dec. 2, 1913.

Application filed June 17, 1913. Serial No. 774,093.

*To all whom it may concern:*

Be it known that I, ISAAC WALTON BUSH, a citizen of the United States, residing at North Carrollton, Carroll county, Mississippi, have invented a new and useful Automatic Dental Blower and Syringe, of which the following is a specification.

This invention relates to an instrument for conveniently supplying a fluid or fluids. This invention has utility when embodied in a blow and wash device for dental use.

Referring to the drawings: Figure 1 is a side elevation of an embodiment of the invention in connection with a dental engine; Fig. 2 is a medial vertical section of the reservoir for the device of Fig. 1; Fig. 3 is a plan view of the reservoir; Fig. 4 is a detail view in section of the three-way valve; Fig. 5 is a view looking down on the three-way valve; Fig. 6 is a section of a reservoir for power driving, as electric motor; Fig. 7 is a section of the reservoir of Fig. 6 at right angles to the showing in Fig. 6; Fig. 8 is an enlarged sectional view of the safety valve of the reservoir; Fig. 9 is an enlarged detail view of the piston inlet check valve; Fig. 10 is an enlarged detail view of the cylinder outlet check valve of Figs. 6 and 7; and Fig. 11 is an enlarged sectional view of the outlet check valve from the cylinder of the reservoir in Fig. 2.

The dental engine 1 has pivoted at the fulcrum 2 the treadle 3 connected by the link 4 to crank 5 for rotating the shaft 6 carrying the fly wheel 7 driving the belt 8 passing upward about the pulley 9 on the swivel head 10 of the engine frame 11. This pulley 9 drives the flexible shaft in the casing 12 which has at its free end the hand piece 13 through which may protrude the rotary tool as a bur 14. Mounted on this hand piece is the bracket 15 carrying a nozzle 16 directed toward the working or free outer end of the rotary tool. Adjacent the nozzle 16 is the three-way valve 17 connecting the nozzle 16 with the air duct 18 and the water duct 19. These ducts extend to the reservoir 20, the air duct to the top or above the surface of the water in said reservoir and the water duct 19 to the bottom or below the surface of the water in said reservoir. Centrally of this reservoir 20 is the cylinder 21 in which operates the piston 22 connected by the piston rod 23 to the cross head 24 and engaged by the parallel bars 25 extending to the yoke 26 actuated by the link 27 connected to extension 28 from the treadle 3. Accordingly the pump is directly and automatically actuated with the dental engine as the rotary tool is driven. The reservoir 20 is embraced by the pair of clamps 29 which serve as guides for the parallel bars 25 and also hold the reservoir 20 in proper adjusted position on the dental engine frame 11.

The piston 22 has the inlet check valve 30 normally held closed by the spring 31 acting between the piston 22 and the head 32 on the valve 30. In operation, when the piston is lifted the suction within the cylinder 21 will pull this valve 30 off its seat and allow air to get in. On the compression or down stroke, this valve is at once seated and the air is forced through the outlet 33 opening the check valve 34 and passing upward through the duct 35 and opening 36 above the water in the reservoir 20. Upon the completion of the stroke or during the upward lift of the piston, the valve 34 at once seats to retain the compressed air in the reservoir. The reservoir is replenished with water from time to time through the opening 37 provided with a cap 38 in which is mounted the safety valve to set a limit of storage pressure on this reservoir. This safety valve embodies the valve 39 normally held seated by the spring 40 acting against the cap 41. Adjustment of the cap 41 may regulate the compression of the spring 40 and thus regulate the pressure under which the dental engine will supply the gas, blow or liquid wash for the particular work being undertaken, all from a common fluid supply reservoir.

Instead of operating the device in connection with a dental engine, the end may be attained conveniently in another way. The motor 42 may have its shaft 43 carry the pinion 44 in mesh with the gear wheel 45 on the shaft 46 mounted in the brackets 47, which brackets 47 also carry the motor 42. Connected by the wrist pin 48 to the gear wheel 45 is the link 49 extending to cross head 50 below the reservoir 51 on which the brackets 47 are mounted. Connected in parallel with this link 49 on the opposite end of the shaft 46 by means of the crank 52 carrying the wrist pin 53 is the link 54 also extending to the cross head 50. The reservoir 51 is mounted on the legs 55. Extending upward from the cross head 50 is the piston rod 56 operating in the cylinder 57 centrally disposed in the reservoir 51. This piston rod 56 carries the piston 58 having inlet check valve 32 therein to which air is supplied through the openings 59 in the piston guide 60. Extending from the cylinder 57 is the duct 61 having outlet check valve 62 therein normally held seated by the spring 63 acting against the head 64. The compression in this pump cylinder overcoming the seating action of the spring 63 and the pressure of the air from the reservoir as transmitted back through the duct 61 causes the air to pass into this duct 61 from the cylinder 57 and thence through openings 65 into the reservoir 51 above the water, thus providing in one cylinder two fluids, each under common pressure for supply through ducts 18, 19, to a dental instrument for use as in blowing out chips and washing out work during operation of the dental tool.

The instrument of the disclosure is susceptible of most convenient use at all times, readily supplying automatically a blow of either a wash or a blow for clearing work, even during the operation of the dental tool, as a bur, thus keeping the work plainly visible for showing just what has been the progress at all stages.

What is claimed and it is desired to secure by Letters Patent is:

1. A dental instrument comprising a reservoir for a liquid and a gas, means for putting the gas under pressure over the liquid, ducts for the liquid and gas, a nozzle, and a valve to connect a liquid duct or a gas duct to said nozzle.

2. A dental instrument comprising a single blow and wash nozzle, a closed reservoir, means for supplying a liquid thereto, a pump in the reservoir for forcing a gas into the reservoir with the liquid, separate ducts for the gas and liquid, and a valve for controlling the supply from said ducts to the nozzle.

3. A dental instrument comprising a liquid and gas reservoir, a pump in the reservoir for placing the contents of the reservoir under pressure, said pump embodying a piston having an intake valve therethrough, a blow and wash nozzle, a gas duct and a liquid duct from said reservoir to said nozzle, and a valve for connecting the gas duct or the liquid duct to said nozzle.

4. A dental instrument comprising a reservoir for a liquid and a gas, a pump within said reservoir having connections to place said liquid and gas under pressure, driving means for the connections mounted on the reservoir, a duct from said reservoir above the surface of the liquid to take off gas, a duct from below the surface of the liquid to take off liquid from the reservoir, a nozzle, and a valve to connect the liquid or the gas duct to said nozzle.

In testimony whereof I affix my signature in the presence of two witnesses.

ISAAC WALTON BUSH.

Witnesses:
S. L. McBRIDE,
B. F. PENTECOST.

---

Copies of this patent may be obtained for five cents each, by addressing the "Commissioner of Patents, Washington, D. C."